United States Patent
Lanigan, Sr. et al.

(10) Patent No.: US 6,190,107 B1
(45) Date of Patent: Feb. 20, 2001

(54) HIGH DENSITY NARROW-PROFILE STORAGE SYSTEM

(76) Inventors: John J. Lanigan, Sr., 14506 Golf Rd., Orland Park; John J. Lanigan, Jr., 1730 Giddington Ct., New Lenox, both of IL (US) 60451

( * ) Notice: Under 35 U.S.C. 154(b), the term of this patent shall be extended for 0 days.

(21) Appl. No.: 09/238,702

(22) Filed: Jan. 27, 1999

(51) Int. Cl.[7] ............................... B65G 67/24
(52) U.S. Cl. .................. 414/342; 414/391; 414/392; 414/561
(58) Field of Search .................... 414/333, 340, 414/342, 344, 334, 335, 336, 392, 389, 391, 561

(56) References Cited

U.S. PATENT DOCUMENTS

| | | | |
|---|---|---|---|
| 1,275,145 | * | 8/1918 | Fitch ..................... 414/342 |
| 1,437,965 | * | 12/1922 | Fitch ..................... 414/342 |
| 1,835,859 | * | 12/1931 | French ................... 414/432 |
| 3,891,100 | * | 6/1975 | Tamaki et al. .......... 414/342 |
| 4,139,107 | * | 2/1979 | Ninomiya et al. ...... 414/392 |
| 5,857,821 | * | 1/1999 | Wiedeck ................. 414/334 |

FOREIGN PATENT DOCUMENTS

| | | | |
|---|---|---|---|
| 61-248828 | * | 11/1986 | (JP) ..................... 414/391 |
| 4243709 | * | 8/1992 | (JP) ..................... 414/392 |
| 524660 | * | 2/1993 | (JP) ..................... 414/389 |

* cited by examiner

*Primary Examiner*—Steven A. Bratlie

(57) ABSTRACT

A high density narrow-profile storage system, comprising the steps of: unloading a container from a train car; storing the container in a storage yard substantially adjacent and parallel to a track; loading the container on a buffer in proximity to the storage yard; lowering the container on a chassis of a tractor trailer; and transporting the container away from the buffer. The system can include: a crane; a narrow-profile storage yard substantially adjacent and parallel to a train track; a buffer adapted to receive and raise or lower a container from or onto a chassis of a tractor trailer; and a tractor for transporting the container to or from the buffer.

14 Claims, 2 Drawing Sheets

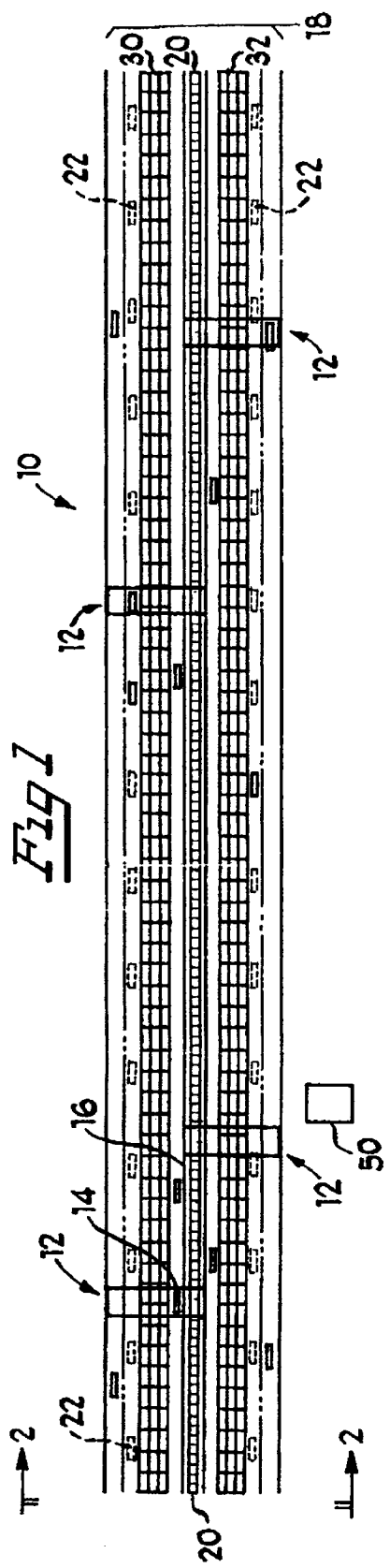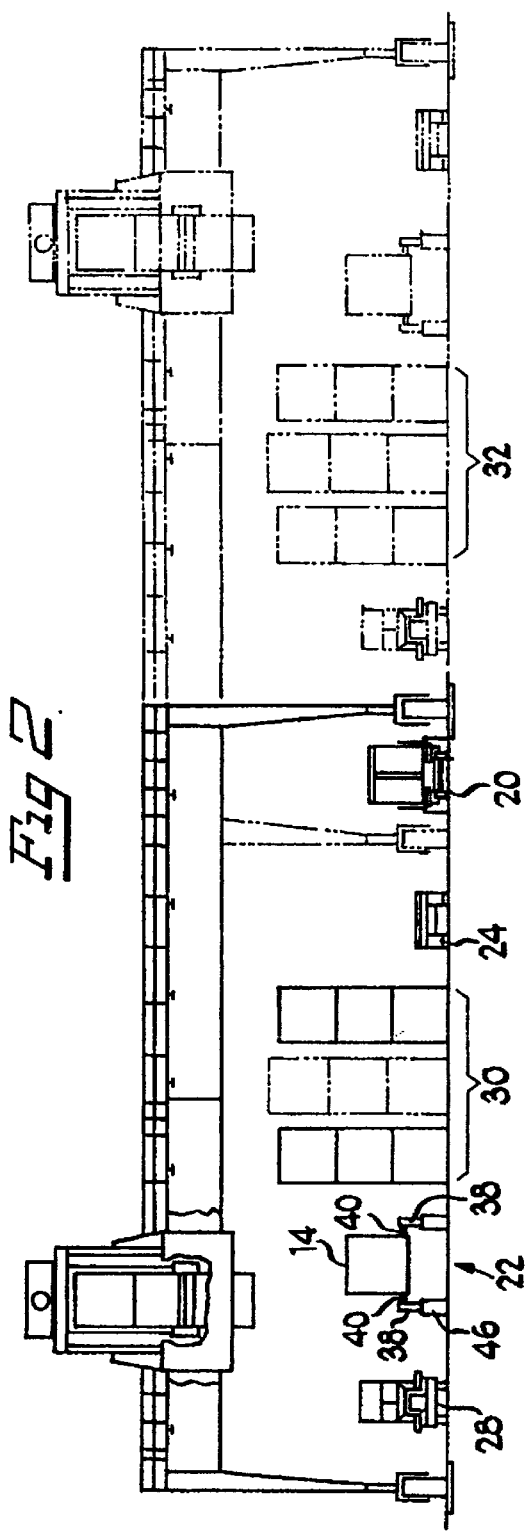

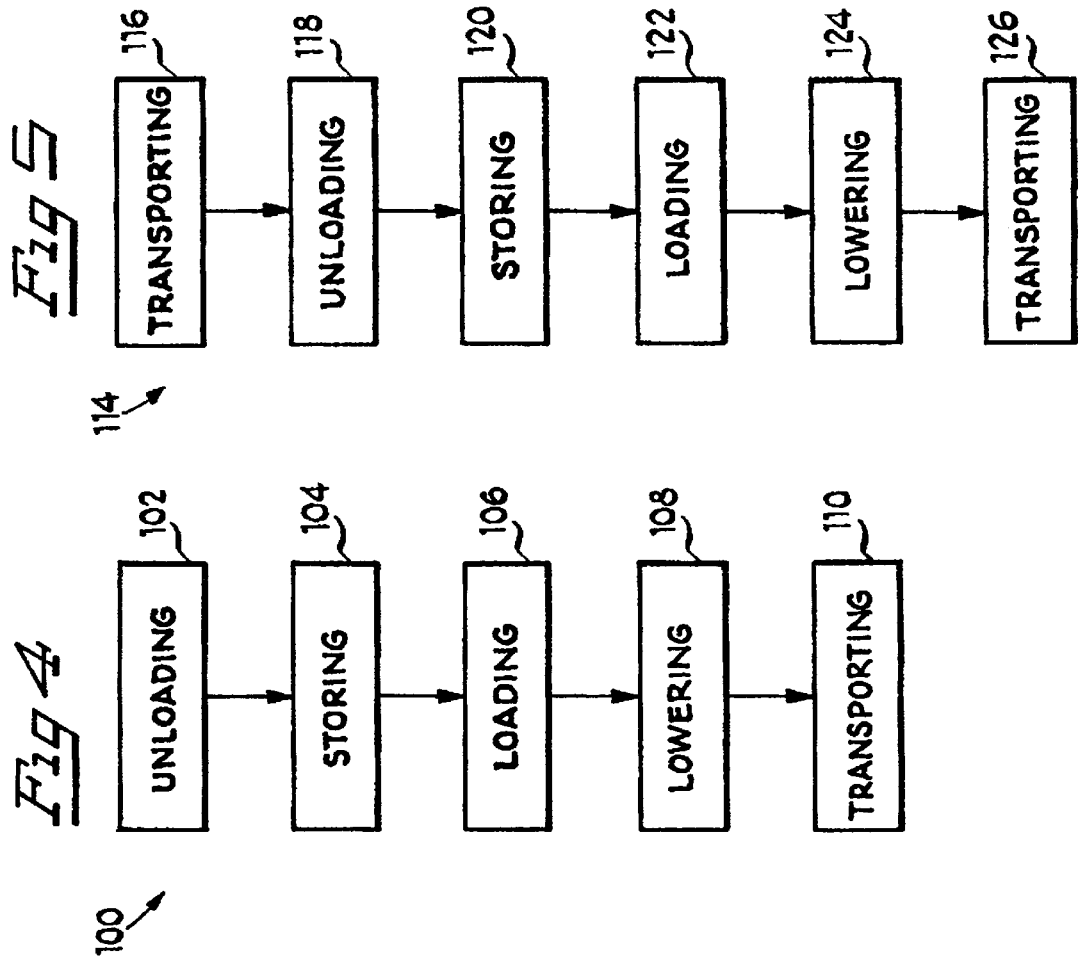

HIGH DENSITY NARROW-PROFILE STORAGE SYSTEM

FIELD OF THE INVENTION

This invention relates to storage and loading systems, and more particularly to a high density narrow-profile storage system.

BACKGROUND OF THE INVENTION

Loading and unloading operations of semi-trailers, containers, cargo containers, storage containers, over-the-road truck trailers and other similar type cargo carrying containers at railroad loading yards, truck terminals, intermodal terminals, intermodal (truck, rail, and port) terminals, freight yards and the like have been unorganized and inefficient in many cases. For example, crane operators and truck drivers often are required to work together, "real time" to load or unload containers on trailer chassis, and crane operators often have difficulty locating containers and often crane operators are required to store containers far away from tracks or in difficult to find places for subsequent loading.

There is need for improving loading and unloading systems in the transportation industry. More particularly, the railroad loading industry could use a loading and unloading approach analogous to air traffic controllers, for improved efficiencies.

Thus, there is a need for a high density narrow-profile storage system, comprising the steps of: unloading a container from a train car; storing the container in a storage yard substantially adjacent and parallel to a track; loading the container on a buffer in proximity to the storage yard; lowering the container on a chasis of a tractor trailer; and transporting the container away from the buffer. In more detail, the high density narrow-profile storage system can include: a crane adapted for unloading a container from a train car; a narrow-profile storage yard substantially adjacent and parallel to a train track; a buffer adapted to receive and lower a container on to a chassis of a tractor trailer; and a tractor for transporting the container away from the buffer.

BRIEF DESCRIPTION OF THE DRAWINGS

FIG. 1 is a top plan view of a high density narrow-profile storage system, in accordance with the present invention;

FIG. 2 is a side view of one embodiment showing a plurality of cranes, trucks, buffers and two storage areas with three rows and three stacked containers in each, in accordance with the present invention;

FIG. 3 is a side view of one embodiment of one of the cranes in FIGS. 1 and 2, in accordance with the present invention;

FIG. 4 is a block diagram of a high density narrow-profile storage system, in accordance with the present invention; and FIG. 5 an embodiment in block diagram of the high density narrow-profile storage system, in accordance with the present invention.

DETAILED DESCRIPTION OF THE PREFERRED EMBODIMENT

Referring to FIG. 1, a high-density, narrow-profile storage system 10 is shown. In its simplest form, the system 10 can include: a crane 12 adapted for unloading a container 14 from a train car 16; a narrow-profile storage yard 18 substantially adjacent and parallel to a train track 20; a buffer 22 adapted to receive and lower a container 14 on to a chassis 24 of a tractor trailer 26; and a tractor 28 or other appropriate mechanism for transporting the container 14 away from the buffer 22. The system provides improved utilization of the available space (real estate) and improved efficiency for loading and unloading of trains.

As should be understood, the system 10 can have application at a rail road terminal as detailed herein, as well as at a truck terminal, port or vessel terminal and the like. Additionally, the system can facilitate loading, storing and unloading operations.

In one embodiment, the crane includes a travel lift like crane available from MiJack Products, Inc. in Hazel Crest, Ill., for improved efficiency in loading and unloading operations. In a preferred embodiment as illustrated in FIGS. 2 and 3, the crane includes: 1.) a telescopic bridge structure adapted to receive at least one container in proximity to the bridge area near the upper section; 2.) a sufficiently high horizontal bridge area capable of freely passing over a plurality of stacked containers in the storage area; and 3.) a universal finger-lifting, support structure adapted to lift and transport any container as detailed herein, from the top, end, sides or bottom. In addition, a preferred crane is capable of carrying small, medium and large containers, ranging for example from carrying one to six containers simultaneously. In more detail, one, two or three containers can be vertically stacked and picked and placed if desired, as well as one or two containers can be positioned horizontally side-by-side, when transported.

The term "container" as used herein has its common ordinary meaning, and can include any type of container, such as an ISO container, domestic container, semi-trailer, enclosure, trailer and the like, as understood by those skilled in the art. As should be understood, ISO containers with conventional corner castings and domestic containers work very well in this system.

In one embodiment, the storage yard 18 includes at least two storage areas 30 and 32 on either side of the track 20 where the train car is located, for improved utilization of available real estate and efficiency.

The storage yard 18 can be a secure area, such as it can be enclosed with a fence and have at least one or more gates.

The buffer 22 can include a frame 36, moveable supports 38 and horizontally extending fingers 40 connected to the moveable supports 38, adapted to support the container. This structure cooperates to facilitate loading of containers from the buffer 22 on to a chassis. The buffer 22 can have a raised position 42 allowing a chassis to be appropriately positioned in proximity to it, such as to be backed therein and thereunder, and a lowered position 44 for lowering the container on a chassis. The buffer 22 has an actuator 46 which can be actuated to raise or lower the supports 38 and fingers 40, thereby freeing up the crane and crane operator to make additional lifts. In an alternate embodiment, the actuator can be remote from the buffer 22 and can be operated from a remote position, such as by a control station operator, truck operator, crane operator or the like. Thus, the actuator can be connected to the buffer 22 with land lines, wirelessly or a combination thereof, by RF, IF or the like depending on the application.

The buffer system 22 can raise or lower a container, which helps to provide flexibility (more options) of operations and improved efficiencies.

A control station 50 can be provided for controlling the loading and unloading operations, and for providing a smooth and efficient flow of tractors in and out of the storage facility. In a preferred embodiment, the control station 50 is adapted to be able to appropriately communicate and/or control one or more of the train, crane, buffer, tractor and gate, via analog or digital signals for example. Additionally, the operators and security personnel are able to communicate with each other, with cellular phones, transceivers, and the like for improved efficiencies of the operations. Thus, the various operators can communicate and/or control various equipment via land lines or wirelessly, in appropriate instances.

Referring to FIG. 4, in its simplest form, the high density narrow-profile storage system, can include the method of: unloading 102 a container from a train car, roadway, port vessel and the like; storing 104 the container in a storage yard substantially adjacent and parallel to a track, roadway, water dock and the like; loading 106 the container on a buffer in proximity to the storage yard; lowering 108 the container on a chassis of a tractor trailer; and transporting 110 the container away from the buffer. This method provides for an improved and efficient storage and loading operation. As should be understood, the system can have application at a railroad terminal, as well as at a truck terminal, port (or vessel) terminal and the like.

The storing step 104 can include providing a plurality of horizontally spaced rows of containers substantially parallel to the track and/or a second providing step including a plurality of vertically stacked containers in at least one of the horizontally spaced rows, for improved space utilization of the available real estate.

In one embodiment, the loading step 104 comprises a substantially unitary step of picking and placing the container on the buffer by use of a crane, such as a travel lift like crane, for improved efficiencies.

It is contemplated for example, that the unloading step 102 can include a "just-in-time" option, comprising unloading the container directly from the train car to the buffer, substantially free of the storing step 104. This could be desirable if a container is needed right away and thus allows for expedited unloading.

The loading step 106 can comprise positioning the buffer substantially adjacent and parallel to the storage yard, opposite the track, for simplified access for drivers. The loading step 106 can further include providing a plurality of buffers strategically positioned adjacent to the storage yard opposite the track, for loading containers onto (and off of) chassis efficiently and effectively in an assembly line and automated basis. For example, crane operators can continue to load containers on buffers while drivers' load or unload containers independent. Thus, a buffer can be unloaded on a chassis, without the necessity of tying up a crane and crane operator. As should be apparent, productivity of the crane operators and truck drivers can be enhanced by this system.

The storing step 104 can include providing first and second storage areas on opposite sides of the track, for improved space utilization.

As should be understood by those skilled in the art, a similar procedure can be implemented for incoming containers entering a terminal, to be loaded onto outbound trains. In this case, the previously detailed method can be reversed. In one embodiment, a gate dispatcher can direct a driver to deliver a container to a designated buffer or track side for the crane to unload from the chassis to a storage area or loading directly onto a train car. If a driver is directed to the buffer, the driver can actuate or insert his plastic key into the buffer actuator, to unload the container from the chassis.

Thereafter the crane would appropriately lift the container and move it to a storage area and/or load on a train car. After the container is unloaded, the driver would remove the passkey from the buffer, drive the rig to the designated exit gate, and inserts the passkey into the exit gate actuator to exit the terminal. If all the information is correct, the passkey is dropped into a reservoir, if desired. The exit gate is opened to allow the driver to exit.

As should be understood by those skilled in the art, this systems described herein can be automated in any appropriate manner, to enhance efficiencies.

As shown in FIG. 5, the system 114, can comprise the steps of: transporting 116 a train on tracks with a plurality of containers on a train car to a desired position; unloading 118 containers from the train car to a storage yard; storing 120 the containers in a storage yard substantially adjacent and parallel to the track; loading 122 a predetermined container on a buffer in proximity to the storage yard; lowering 124 the predetermined container on a chassis of a tractor trailer; and transporting 126 the container away from the buffer with a tractor.

As illustrated in FIG. 1, the unloading step 118 can include unloading more than one container from the train car substantially simultaneously or at the same time, for improved efficiency.

In more detail, the unloading step 118 includes unloading containers from the train car substantially simultaneously with two cranes.

The unloading step 118 can include unloading containers from the train car directly to the buffer, substantially free of the storing step 120, defining a just-in-time feature when appropriate.

As should be understood, the system can have application at a railroad terminal as detailed herein, as well as at a truck terminal, port (or vessel) terminal and the like. Additionally, the system can facilitate loading, storing and unloading operations.

EXAMPLE 1

A driver arrives at a gate and enters with a tractor and empty chassis to pick up a container. The container has serial number 01701. The driver presents the appropriate documents verifying that he or she has approval to pick up a container, such as the one with serial number 01701. This information can be logged into a computer and communicated to a crane operator. The crane operator is instructed as to the location of the container, and where to deliver it, such as to a designated buffer or track side location.

During the logging in step, the serial number of the container is noted, a plastic key is made with the serial number ie. 01701, the buffer number location, aisle (location) and what gate to exit after picking up the container, is provided the driver.

When the gate dispatcher completes the log in process, the passkey is given to the driver who drives the chassis under the appropriate buffer. After spotting the chassis under the appropriate buffer, the driver gets out of the tractor and inserts the passkey into a slot or actuator on the buffer. Upon insertion of the passkey, a verification process is begun, for example the container's serial number is compared against the one identified on the passkey to make sure there is a correct match. If there is a match, the container is lowered onto the chassis. After the container is loaded, the driver locks in the container to the chassis, removes the passkey from the buffer, drives his or her rig to the designated exit gate, and inserts the passkey into the exit gate actuator. If all the information is correct, the passkey is collected and the exit gate is opened to allow the driver to exit from the terminal.

EXAMPLE 2

As should be understood, a similar procedure can be utilized for incoming containers entering the terminal to be loaded onto outbound trains. In this case, a gate dispatcher directs a driver to deliver a container to a designated buffer or track side for the crane to unload from the chassis to storage or loading onto a train car. If a driver is directed to a buffer, the driver can actuate or insert his plastic key to the buffer actuator to unload the container from the chassis, by raising the container above the chassis with the fingers. Thereafter the crane is appropriately lift the container and move it to a storage area and/or load it on a train car. After the container is unloaded, the driver removes the passkey from the buffer, drives his or her rig to the designated exit gate, and inserts the passkey into the exit gate actuator to exit the terminal. If all the information is correct, the exit gate is opened to allow the driver.

Although various embodiments of the invention have been shown and described, it should be understood that various modifications and substitutions, as well as rearrangements and combinations of the preceding embodiments, can be made by those skilled in the art.

What is claimed is:

1. A high density narrow-profile storage method, comprising the steps of:

providing a storage yard including a track, a storage area adjacent and parallel to the track and a plurality of strategically positioned buffers adjacent and parallel to the storage area;

unloading a container from a train car;

storing the container in the storage area;

loading the container on one of the strategically positioned buffers in proximity to the storage area, in a substantially unitary step of picking and placing the container on one of the strategically positioned buffers by use of a crane;

lowering the container which is on one of the strategically positioned buffers, on a chassis of a tractor trailer; and transporting the container away from one of the strategically positioned buffers, with a tractor trailer.

2. The method of claim 1 wherein the storing step includes providing a plurality of horizontally spaced rows of containers substantially parallel to the track.

3. The method of claim 2 wherein the storing step includes a second providing step including a plurality of vertically stacked containers in at least one of the horizontally spaced rows.

4. The method of claim 1 wherein the loading step comprises:

providing the crane with a telescopic bridge structure adapted to receive at least one container in proximity to the bridge structure near an upper section;

providing a sufficiently high horizontal bridge area capable of freely passing over a plurality of stacked containers in the storage area; and providing a universal finger-lifting support structure adapted to lift and transport containers from at least one of a top, end, sides and bottom.

5. The method of claim 1 wherein the loading step further includes providing a plurality of buffers strategically positioned adjacent to the storage area opposite the track.

6. The method of claim 1 wherein the storing step includes providing first and second storage areas on opposite sides of the track.

7. The method of claim 1 wherein the unloading step includes unloading a plurality of containers from the train car substantially simultaneously.

8. The method of claim 1 wherein the unloading step includes unloading containers from the train car substantially simultaneously with a plurality of cranes.

9. A high density narrow-profile storage system, comprising:

a crane adapted for transporting a container to or from a train car, the crane includes a travel lift;

a narrow-profile storage yard substantially adjacent and parallel to a train track, the storage yard including a storage area adjacent and parallel to the track and a plurality of strategically positioned buffers adjacent and parallel to the storage area;

a plurality of strategically positioned buffers adapted to receive and at least one of raise and lower a container from or on to a chassis of a tractor trailer; and a tractor for transporting the container to or from the buffer.

10. The system of claim 9 wherein the storage yard includes at least two storage areas on either side of a track where the train car is located.

11. The system of claim 9 wherein the storage yard is substantially enclosed with a fence and has at least one gate.

12. The system of claim 9 wherein the buffer includes a frame, moveable supports, and horizontally extending fingers 40 connected to the moveable supports, adapted to support a container in a raised position above a chassis and a lowered position for lowering a container on a chassis or raising the container above a chassis.

13. The system of claim 9 further comprising a control station.

14. The system of claim 9 further comprising a control station adapted to communicate with at least one or more of the train, the crane, the buffer, the tractor and a gate.

* * * * *